United States Patent Office 3,823,009
Patented July 9, 1974

3,823,009
AGGLOMERATION OF TITANIUM ORES CONTAINING IRON
Gunter Lailach and Gerhard Winter, Krefeld, Germany, assignors to Farbenfabriken Bayer Aktiengesellschaft, Leverkusen, Germany
No Drawing. Filed Jan. 25, 1972, Ser. No. 220,677
Claims priority, application Germany, Feb. 9, 1971, P 21 05 932.5
Int. Cl. C21b *1/00, 1/08;* C22b *1/00*
U.S. Cl. 75—3
11 Claims

ABSTRACT OF THE DISCLOSURE

In the production of agglomerated iron-containing titanium ores suitable for reduction of the iron contained therein, wherein finely divided ore particles are wetted, shaped into larger molded agglomerates, dried and hardened, the improvement which comprises admixing with said ore particles prior to hardening about 0.04 to 30% by weight of the ore of a compound of iron, titanium or mixtures thereof. The admixed compounds are preferably oxides or materials which yield oxides under the ambient conditions. Desirably about 0.005 to 10% by weight of a water-soluble organic polymer is also added to form a better bond. The molded agglomerates of about 1 to 30 mm. are preferably hardened in an oxidizing atmosphere at about 700 to 1300° C. and thereafter optionally without cooling reduced with carbon, methane or hydrogen at about 700 to 1300° C. to convert the iron therein to metallic state.

---

The invention is concerned with a process for the economic production of pellets or briquettes from titanium ores containing iron which are suitable for the reduction of the oxidized iron contained therein by means of solid carbon-containing or gaseous reducing agents at temperatures below the sintering temperature, wherein iron and/or titanium compounds and, if desired, water-soluble organic polymers are used as binders.

It is known that synthetic rutile suitable for the preparation of titanium tetrachloride can be produced by reduction of the oxidized iron in iron-containing titanium ores, in particular ilmenite, at temperatures of from about 700° C. to 1300° C with gaseous or solid reducing agents and separation of the metallic iron. Before the actual reduction, the ores are preferably roasted in an oxidizing atmosphere at temperatures below the sintering temperature in order to convert the iron (II) to iron (III). In ths case, the particle size of the ores is mainly within the range of from about 40 to 1000 microns. In the reduction with coke in a rotary furnace, the coke, in order to avoid too high a carry-over, has sizes up to 1.5 cm. These size and density conditions of the coke and ore result in very poor mixing of the reactants in the rotary furnace which give rise to long residence times and low quality of the product. In order to achieve better mixing of ore and coke the ore particles would have to be about 1.5 times as large as the particles of coke (cf. M. Ullrich, Chem. Ing. Techn. 41 (1969) 903–907).

The problem of thoroughly mixing the ore and coke can be solved if the ore, for example by agglomeration, can be brought up to larger particle sizes than the coke. However, the commercial iron-containing titanium ores, especially the high-grade sandy ores from secondary deposits, are not suitable for granulating and pelletizing without a binder. Agglomeration using the reducing agent as a binder is usually not practicable since it is best to submit the ore before reduction to an oxidizing roast. In order to produce agglomerates containing carbon, the ore would have to be cooled after oxidation and after agglomeration heated up again to the reaction temperature. Other binders used in the reduction of iron ores, such as bentonite, are undesirable because they adversely affect the quality of the synthetic rutile obtained in the process.

In the case of the reduction of ilmenite with gaseous reducing agents such as CO, $CH_4$ or $H_2$ in a fluid bed, problems arise, especially in the case of ores from primary deposits. In order to purify them sufficiently, these ores have to be ground and separated from dross by flotation. This produces very fine particles not suitable for reduction in a fluid bed because they are carried out by the stream of gas. Use of these finely divided ilmenites is only practicable if they can employed in the form of agglomerates. Since a preliminary oxidation is also desirable when using gaseous reducing agents, the same requirements apply to these agglomerates as in the case of reduction with coke.

We have now found a process for the production of agglomerates of titanium ores containing iron suitable in particular for the reduction of the iron with carbon or hydrogen at temperatures of from about 700° C. to 1300° C. preferably after an oxidizing pretreatment. The finely divided ore particles are wetted, shaped into larger molded agglomerates, dried and hardened but, prior to hardening, there are admixed with said ore particles about 0.04 to 30% by weight thereof of a compound of iron, titanium or mixtures thereof.

Oxides and hydrated oxides of iron, iron hydroxide and iron salts which decompose to iron oxides under the conditions of the process, are suitable for use as iron compounds. Powdered iron oxide obtained, for example, as a by-product in the thermal decomposition of pickling liquors, is particularly suitable. Suitable titanium compounds are titanium dioxide or oxyhydrate which can be employed in the form of a powder or slurry.

The amounts of iron and/or titanium compounds which must be used as binder per unit weight of titanium-iron ore in the agglomeration depend mainly on the grain size and chemical composition of the ore and of the binder. Thus, if the ore is relatively fine-grained, 0.04 percent by weight is sufficient for the production of pellets. Preferably, however, in order to obtain green pellets of satisfactory strength, more than 0.5 percent by weight of binder is used.

An upper limit is set mainly by the economics of the process. Besides this, the porosity of the pellets diminishes with increasing content of binder and hence the reaction velocity during their oxidation and reduction. If pellets are roasted under conditions in which oxidizing roasting of the ore also takes place, i.e. preferably at about 800 to 1000° C., their strength passes through a maximum depending on the content of iron- and/or titanium-containing binder. The optimum content of binder as regards the strength of the pellets depends on the distribution of grain size and chemical composition both of the ore and binder and on the conditions during the roasting of the pellets. Normally from about 0.04 to 30 percent by weight, preferably about 0.5 to 15 percent by weight, of iron- and/or titanium-containing binders are employed.

It was found that with water-soluble organic polymers pellets could also be produced without addition of iron or titanium compounds. The organic polymers act like adhesives in the production of green pellets. When the pellets are roasted in an oxidizing atmosphere, these polymers are burnt so that pure ore pellets are obtained. With the same roasting temperatures, the strength of these pellets is, however, lower than that of pellets containing iron and/or titanium compounds as binders in optimum amounts; the use of organic polymers as adhesives in combination with iron and/or titanium compounds, however, makes it possible to make sufficiently strong green pellets with very small amounts of iron and/or titanium compounds that can be roasted in an oxidizing atmosphere to produce strong pellets.

Examples of water-soluble organic polymer that can be added in amounts of about 0.005 to 10, preferably about 0.05 to 2 percent by weight, to the ore are starch, dextrin, ligninsulfonic acid, water-soluble cellulose derivatives such as methyl-cellulose or carboxymethylcellulose, alginic acid, gelatin glue, agar agar, casein, tragacanth, poly-saccharides, polyvinylalcohol, polyethyleneimine, polyvinylpyrrolidone, polyethyleneglycol, polyacrylic acid and polyacrylamides. In principle, salts of acid-reacting compounds may also be used but polymers containing no metal ions are preferred. The water content of the mold pieces (green pellets) must be sufficient to wet the ore particles and to produce moldable but coherent green pellets. The size of the pellets should be in the range of from about 1 to 30, preferably from about 2 to 15 mm., in diameter.

Tests have shown that ores with more than about 50% of titanium give stronger pellets when they are pelletized with iron compounds as binders, while ores with less than about 45% titanium and more than about 35% of iron give stronger pellets using titanium compounds as binders.

It has also been found that, in order to produce strong pellets, it is particularly advantageous to cover green pellets that have been produced with iron compounds as binders, with powdered titanium compounds and green pellets that have been produced using titanium compounds as binders, with powdered iron compounds.

As roasting temperature, for the pellets, it has been found that the same temperatures are suitable as are normally employed in the preliminary oxidation of titanium-iron ores, i.e. temperatures in the range of from about 700 to 1200° C., preferably about 800 to 1000° C. It was observed that the strength of the pellets falls again if the roasting time in the case of temperatures of from about 1100–1200° C. is too prolonged. For each ore it is therefore necessary to discover and adhere to an optimum roasting temperature and duration. In general, a duration of roasting of from about 0.5 to 4 hours is sufficient and this time should normally not exceed about 8 hours. The strength of the pellets from titanium-iron ores is sufficient to enable them to be reduced in the rotary furnace if the roasting in an oxidizing atmosphere is carried out at from about 800 to 1000° C. Of course, in addition to producing green pellets by granulation it is also possible to make green pellets, with the aid of suitable equipment, in the form of tablets or briquettes and to roast these under oxidizing conditions to produce pellets.

The process of the present invention has a number of advantages. No impurities adversely affecting the quality are introduced by the binder. In judging the quality of titanium ores, use is made not only of the titanium content but also of the sum of the titanium and iron-oxide contents which should be as large as possible.

An important advantage of the process of the invention arises from the fact that the hardening of the green pellets can be combined with the oxidation process—(pre-oxidation)—and the high temperatures of 1000 to 1250° C. usual in the pelletizing of iron ores are not necessary. The freshly roasted hot pellets can, without much loss of heat, be fed directly into the reduction process.

Furthermore, flotated ores from primary deposits can be made suitable for reduction in rotary furnaces. These ores cannot be used at all or at least only after separation of the fines, without preliminary pelletization, on account of their high content of fine-grained material under about 0.07 mm. in diameter.

The following Examples are intended to illustrate the process of the invention.

EXAMPLE 1 (COMPARISON EXAMPLE)

Ilmenite sand containing 50% by wt. $TiO_2$, 33.6% by wt. FeO and 10.3% by wt. $Fe_2O_3$, the grain sizes of which were between 40 and 200 microns, was molded without a binder with water to form spherical "green pellets." On drying, all these "green pellets" fell apart.

EXAMPLES 2 TO 12

The same ilmenite as in Example 1 was granulated on granulating plate using various binders. The ilmenite in Example 2 was sprayed with a 5% aqueous solution of gelatin glue. In Example 3, 0.5% by wt. $Fe_2O_3$-pigment was admixed with the ilmenite and the mixture also sprayed with a 5% aqueous solution of gelatin glue. In Examples 4 and 5 different amounts of $Fe_2O_3$-pigment were mixed with the ilmenite (cf. Table) and moistened with water. In Example 6 the ilmenite was mixed with FeO(OH)-pigment, in Example 7 with $Fe_3O_4$-pigment, in Example 8 with dried and ground aqueous $TiO_2$-hydrolysis slurry from the $TiO_2$-sulfate process, in Example 9, 3% $TiO_2$-hydrolysis slurry was added and the whole sprayed with a 0.5% gelatin glue solution. In Example 10 green pellets which had been prepared as in Example 5 were dusted with as much $TiO_2$ pigment as would adhere to the surface of the moist pellets. In Example 11 green pellets prepared as in Example 8 were powdered in the same way with $Fe_2O_3$-pigment. In Example 12 ilmenite as in Example 2 was molded into green pellets with gelatin glue solution and then the surface was powdered with a mixture of $Fe_2O_3$-pigment and $TiO_2$-pigment in a ratio by weight of 2:1. The moist granules were dried at 120° C. and heated for 1 hour in the air at 900° C. By the end of this time in the case of all the pellets except those prepared with bentonite as binder, over 95% of the iron of the ilmenite had been oxidized to the trivalent state.

The binders used in each case, the amounts of binder and the strength of the spherical pellets, the diameter of which was 10 to 12 mm., are summarized in the following table.

TABLE

| Example No. | Binder | Amount of binder added, percent by wt. | Compressive strength, kp./pellet Minimum | Maximum |
|---|---|---|---|---|
| 2 | Glue | 0.5 | 12.5 | 16.4 |
| 3 | Glue/$Fe_2O_3$ | 0.5/0.5 | 22.1 | 29.7 |
| 4 | $Fe_2O_3$ | 0.5 | 24.4 | 31.3 |
| 5 | $Fe_2O_3$ | 3.0 | 30.5 | 50.5 |
| 6 | FeO(OH) | 0.5 | 31.4 | 48.6 |
| 7 | $Fe_3O_4$ | 3.0 | 36.1 | 45.9 |
| 8 | $TiO_2$ | 0.5 | 29.5 | 41.8 |
| 9 | Glue/$TiO_2$ | 0.5/3.0 | 61.0 | 84.2 |
| 10 | $Fe_2O_3$ (with $TiO_2$ powdered) | 3.0/0.05 | 54.0 | 81.0 |
| 11 | $TiO_2$ (with $Fe_2O_3$ powdered) | 3.0/0.05 | 83.1 | 106.0 |
| 12 | Glue (with $Fe_2O_3$ + $TiO_2$ powdered) | 0.5/0.04 + 0.02 | 37.3 | 49.6 |

As can be understood from Examples 2, 3 and 9 gelatin glue was added when molding the ilmenite ore into green pellets to make them more stable for further processing. Similar results were obtained using other water-soluble organic polymers in like amounts, e.g. starch, ligninsulfonic acid, agar agar, polyvinylalcohol.

EXAMPLE 13

(a) Sandy ilmenite, as used for pelletizing, was oxidized for 2 hours in the air at 900° C. Then the ilmenite was reduced with dried brown coal (particle size 2–10 mm.) in a 50 cm. diameter rotary furnace at 980° C., with the charge occupying 15% of the cubic capacity of the furnace. After 3.5 hours residence time, 93% of the iron had been converted to the metallic state.

(b) Pellets prepared as in Example 5 were reduced under the same conditions as the ilmenite sand (Example 13a). In this case, after a residence time of 2–2.5 hours 94% of the iron had already been reduced.

After reduction the pellets were more easily broken into particles of about the size of original ilmenite sand than before reduction. These particles were consisting of 41% by weight of a porous matrix of mainly titanium oxide and of 39% by weight of metallic iron dispersed therein.

It will be appreciated that the instant specification and examples are set forth by way of illustration and not limitation, and that various modifications and changes may be made without departing from the spirit and scope of the present invention.

What is claimed is:

1. In the production of agglomerated iron-containing titanium ores suitable for reduction of the iron contained therein, wherein finely divided ore particles are wetted, shaped into larger molded agglomerates, dried and hardened, the improvement which comprises admixing with said ore particles prior to hardening about 0.04 to 30% by weight of the ore of a compound selected from the group consisting of the oxides and hydrates of iron, titanium or mixtures thereof, such oxides or hydrates functioning to bond the ore to form said agglomerate, and thereafter hardening in an oxidizing atmosphere to convert substantially all of the iron therein to the trivalent state.

2. Process according to Claim 1, wherein the hardening is carried out at a temperature of about 700 to 1300° C.

3. Process according to Claim 1 including feeding the molded agglomerates while still hot directly into a reduction stage.

4. Process according to Claim 1, wherein the still wet molded agglomerates prior to drying are powdered with compounds of iron, titanium or mixtures thereof.

5. Process according to Claim 1, wherein there is also admixed with said ore particles about 0.005 to 10% by weight thereof of a water-soluble organic polymer.

6. Process according to Claim 1, wherein the admixed compound of iron or titanium is the oxide or a compound yielding the oxide under the conditions of hardening the molded agglomerates.

7. Process according to Claim 1, wherein the ore has a particle size of about 40 to 1000 microns, the compound of iron, titanium or mixtures thereof is added in at least about 0.5% by weight, a water-soluble organic polymer in an amount of about 0.05 to 2% by weight is also admixed with the ore particles, the particles are shaped into molded agglomerates of about 1 to 30 mm. and the hardening is effected at a temperature of about 800 to 1000° C. in an oxidising atmosphere.

8. Process according to Claim 7, wherein the still hot molded agglomerates are directly reduced with carbon, methane or hydrogen at a temperature of about 700 to 1300° C. to convert the iron contained therein to metallic iron.

9. A molded agglomerate of about 1 to 30 mm. made by the process of Claim 1 and comprising sub-particles of iron-containing titanium ore having a particle size of about 40 to 1000 microns and about 0.04 to 30% by weight of the ore particles of a compound of iron, titanium or mixtures thereof, the agglomerate having an overall iron oxide content of about 5 to 90% by weight and titanium oxide content of about 95 to 10% by weight.

10. A molded agglomerate according to Claim 9, wherein the compound is iron oxide, titanium oxide or mixtures thereof present in at least about 0.5% by weight.

11. A molded agglomerate according to claim 10, wherein the compound is present as a powder layer on the outside of said agglomerate.

References Cited
UNITED STATES PATENTS

| | | | |
|---|---|---|---|
| 2,750,255 | 6/1956 | Creitz et al. | 75—1 |
| 2,811,434 | 10/1957 | Möklebust | 75—3 |
| 3,457,037 | 7/1969 | Aramendia et al. | 75—1 |

OTHER REFERENCES

Klinefelter, T. A.: "Evaluations of Some Binders for Use In Pelletizing Slimes," Bureau of Mines, R.I. 3846, January 1946, pp. 7–9.

Kenworthy, H.: "Nodulization and Pelletization of Lluocite Fluorite Flotation Concentrates," Bureau of Mines, R.I. 4829, December 1951, pp. 1–13.

ALLEN B. CURTIS, Primary Examiner

M. L. BELL, Assistant Examiner

U.S. Cl. X.R.

75—1